United States Patent [19]
Abe

[11] 3,788,727
[45] Jan. 29, 1974

[54] OPTICAL SYSTEM OF A BINOCULAR MICROSCOPE

[75] Inventor: Kuniomi Abe, Nishinomiya, Japan

[73] Assignee: Konan Camera Laboratory Company Limited, Kobe, Japan

[22] Filed: Nov. 29, 1971

[21] Appl. No.: 202,748

[30] Foreign Application Priority Data
Nov. 28, 1970  Japan.............................. 45/118282

[52] U.S. Cl..................................... 350/36, 350/17
[51] Int. Cl. ............................................. G02b 21/20
[58] Field of Search.......................... 350/35, 36, 17

[56] References Cited
UNITED STATES PATENTS
3,173,984   3/1965   Vogl ................................... 350/36
1,632,930   6/1927   Siedentopf....................... 350/35 X FOREIGN PATENTS OR APPLICATIONS
928,215   6/1963   Great Britain........................ 350/35
57,211   8/1967   Germany ............................... 350/36

Primary Examiner—David H. Rubin
Attorney, Agent, or Firm—John J. McGlew

[57] ABSTRACT

The optical system includes two microscopes arranged at an angle to each other so that their optical axes intersect at an object to be observed, with each microscope including a respective main objective at its light entry end and a respective eyepiece at its light exit end. The two eyepieces are parallel to each other in a common plane so that their optical axes extend parallel to each other, and each of two eccentric objectives is positioned in front of a respective main objective and the two eccentric objectives are arranged in parallel in the same plane. The eccentric objectives redirect the diverging ray bundles, arriving thereat from the object to be observed, to extend parallel to each other through the eyepieces. Respective diaphragming rings are arranged centrally in the field of vision of each eyepiece, and each ring has a circular aperture therein eccentric to the field of vision of the associated eyepiece. The two apertures have the same eccentricity, and the two rings are relatively adjustable so that the images in both eyes coincide with each other without any conscious effort.

3 Claims, 4 Drawing Figures

PATENTED JAN 29 1974 3,788,727
FIG. 1
FIG. 2
FIG. 3
FIG. 4
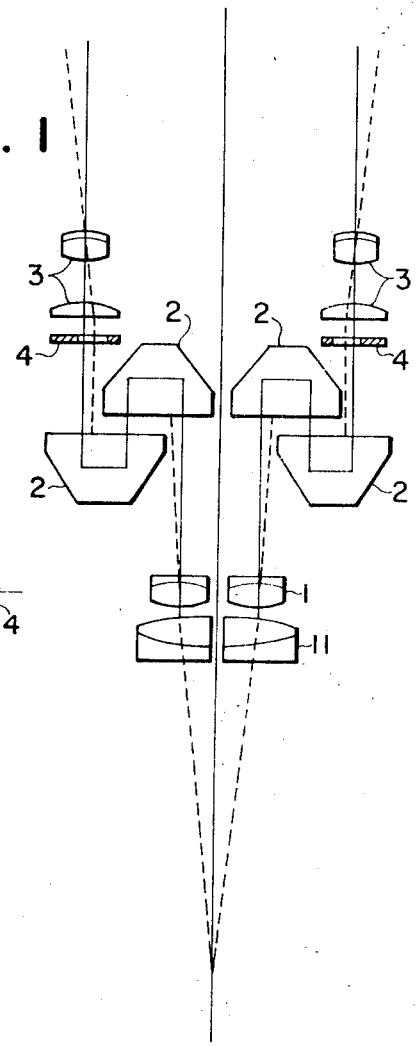
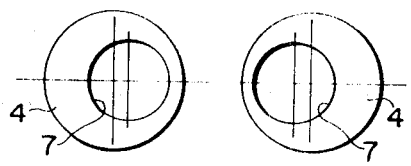
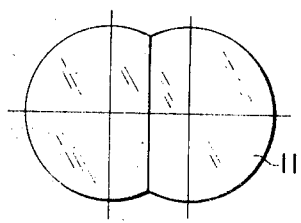
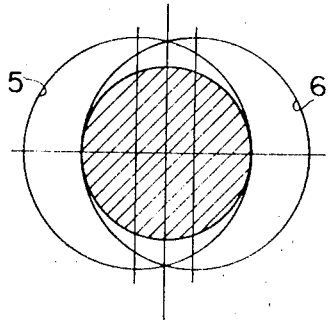
INVENTOR
KUNIOMI ABE
BY
ATTORNEY

OPTICAL SYSTEM OF A BINOCULAR MICROSCOPE

FIELD AND BACKGROUND OF THE INVENTION

This invention relates to an optical system of a binocular microscope formed so that both eyepieces may be set horizontally while the optical axes are inclined with each other by a fixed amount.

A conventional binocular microscope is formed of objectives, deflecting prisms inclining the optical axes with each other by a fixed amount, erecting prisms, vision field diaphragming rings diaphragming optical images to be of a fixed size and eyepieces, and is based on the known principle that two microscopes are arranged at a proper angle with each other so that their optical axes may intersect or cross each other on an object.

In the general binocular microscope formed as mentioned above, as the optical axes are arranged at a proper angle (in fact, about 12 degrees) with each other, the eyepieces will necessarily be inclined relative to each other, which has the disadvantge that the observation with it is difficult. In some, the deflecting prisms are eliminated and the eyepiece parts are made parallel with each other. But, from the viewpoint of practical uses, where the light paths are inclined, the image in both eyes will more integrally unite with each other without conscious efforts.

SUMMARY OF THE INVENTION

An objective of the present invention is to provide a vinocular microscope wherein eccentric auxiliary objectives, making images eccentric, are provided in front of the usual respective objectives, and eccentric diaphragming rings, making vision field diaphragms eccentric by a fixed amount, are used, so that the disadvantage, mentioned above, in the general binocular microscope may be eliminated.

For an understanding of the principles of the invention, reference is made to the following description of a typical embodiment thereof as illustrated in the accompanying drawings.

BRIEF DESCRIPTION OF THE DRAWINGS

In the drawings:

FIG. 1 is a schematic illustration of an optical system according to the present invention;

FIG. 2 is a view showing the diaphragming rings of the present invention;

FIG. 3 is a plan view of auxiliary objective of the same; and

FIG. 4 is an explanatory view showing a range in which images in both eyes will coincide with each other in the case where diaphragming rings according to the present invention are used.

DESCRIPTION OF THE PREFERRED EMBODIMENT

Two eccentric auxiliary objectives 11, cut off in part, are arranged, as made eccentric by a fixed amount, in a position in which the respective cut surfaces may be opposed to each other in front of respective objectives 1 in an optical system of a general binocular microscope. The function of these eccentric objectives is a combination of the functions of adjusting the visibilities of both eyes and of deviating images inward, by a fixed amount, on the focal planes of respective eyepieces 3.

The reason why the images are deviated inward is that, as described above, it is necessary to incline the optical axes relative to each other so that the images in both eyes may be integrally united unconsciously in the binocular microscope. However, when the images as deviated inward are seen with the two eyes through eyepieces 3, the images in both eyes will integrally unite with each other but, if the vision field diaphragming rings are arranged concentrically with the optical axes, as in the conventional microscope, the images in the two eyes will not coincide with each other and there will be a difficulty in observation. Now, in FIG. 4, 5 is an image in the left eye and 6 is an image in the right eye. In order to eliminate the above mentioned difficulty, in the present invention, as shown in FIG. 2, eccentric diaphragming rings 4, in each of which the center of a circular diaphragming aperture 7 is provided as deviated by any amount from the optical axis of the eyepiece, are mounted so that both diaphragming apertures 7 may be moved inward to each other and the centers of the diaphragming apertures may be positioned on the same center line. If they are thus provided, while both eyepieces are set in parallel with each other, only a part of the vision fields (the hatched part in FIG. 4) will be able to be observed. It is possible to make the above mentioned auxiliary objectives 11 integral with the main objectives 1 located above them. However, in the use, when the optical systems other than the auxiliary objectives 11 are used with the optical axes set together, the deterioration of the image will be able to be remarkably reduced. Therefore, it is effective to use the auxiliary objectives separated from the other optical systems. Thus, in the case of assembling the optical systems, the optical systems other than the auxiliary objectives are optically adjusted in the same manner as in the general binoculars, and then the auxiliary objectives 11 are fitted implace.

As mentioned above, in this invention, by the functions of the auxiliary objectives 11 and eccentric vision field diaphragming rings 4, both eyepieces can be set in parallel with each other while the optical axes are inclined to each other by a fixed amount. Therefore, the characteristics of a binocular microscope can be retained, and there are advantages that the binocular microscope of the present invention is more convenient for observation than any conventional one and that the fatigue of the observer can be remarkably reduced and there are great advantages particularly in the magnified observation of a spot in a surgical operation and the magnified inspection of a recess in a machine.

I claim:

1. In an optical system of a binocular microscope in which two microscopes are arranged at an angle to each other so that their optical axes intersect at an object to be observed, with each microscope including a respective main objective at its light entry end and a respective eyepiece at its light exit end, the improvement comprising, in combination, the two eyepieces being parallel to each other in a common plane and having their optical axes extending parallel to each other; two eccentric objectives each positioned in front of a respective main objective and arranged in parallel in the same plane, said eccentric objectives redirecting the diverging ray bundles, arriving thereat from the object to be observed, to extend parallel to each other through said eyepieces; said eccentric objectives, in plane, being equal segments of equal circles with each segment extending through more than 180°; the chordal edges of said eccentric objectives abutting each other; and a pair of diaphragming rings each arranged in the field of vision of a respective eyepiece and centered on the optical axis thereof, each diaphragming ring having a circular aperture therein eccentric to the optical axis of the associated eyepiece.

2. In an optical system of a binocular microscope, the improvement claimed in claim 1, in which said circular apertures have equal diameters and eccentricities.

3. In an optical system of a binocular microscope, the improvement claimed in claim 2, in which said diaphragming rings are adjustable relative to each other to provide a common image in the fields of vision of the associated eyepieces.

* * * * *